April 21, 1964

J. M. WALTER 3,129,641

LEVEL ADJUSTING MECHANISM FOR THE CROSS-RAIL
OF A PLANAR TYPE MACHINE TOOL

Filed June 6, 1960

INVENTOR.
JOHN M. WALTER,
BY Allen & Allen
ATTORNEYS.

INVENTOR.
JOHN M. WALTER,

United States Patent Office 3,129,641
Patented Apr. 21, 1964

3,129,641
LEVEL ADJUSTING MECHANISM FOR THE CROSS-RAIL OF A PLANAR TYPE MACHINE TOOL
John M. Walter, Cincinnati, Ohio, assignor to The G. A. Gray Company, Cincinnati, Ohio, a corporation of Ohio
Filed June 6, 1960, Ser. No. 34,325
12 Claims. (Cl. 90—16)

This invention relates to machine tools of the planar type such as planars and planar type boring, drilling and milling machines. More particularly it relates to a mechanism for adjusting a level of the cross-rail of machines of the type described above.

Planar type machine tools generally have a bed upon which a reciprocating table is mounted and are provided on each side of the bed with a column. A cross-rail extends across the bed and table between the columns and is arranged for vertical movement with respect to the columns on cooperating ways by means of elevating screw and nut arrangements. Generally there is an elevating screw in each column and each of the elevating screws cooperates with a nut. Means are provided to produce relative rotation between the screws and nuts in the two columns concurrently to raise or lower the cross-rail. In most machine tools of the type under consideration, the elevating screws are rotated while the nuts are stationary but in some machine tools of this type the elevating screws are stationary and means are provided for rotating the nuts. In either event, the result of the relative motion is to produce relative axial motion between the nut and screw and since the screw is normally fixed against axial movement, the nut, which is fixed against axial movement with respect to the cross-rail, produces movement of the cross-rail with respect to the column.

For one reason or another, it is possible that the cross-rail will not be perfectly level. This may be the result of manufacturing error or of misalignment of the parts and although the cross-rail is usually not out of level by a large amount, it is often very important that the cross-rail be perfectly level.

It is therefore the principal object of the present invention to provide means for adjusting the level in a simple and relatively inexpensive manner.

It is another object of the invention to provide a level adjustment mechanism which makes it possible to adjust the level of the cross-rail without disconnecting any gears or providing any clutches in the cross head elevating drive. It is yet another object of the invention to provide for very fine adjustment so that great accuracy may be achieved.

These and other objects of the invention which will be described in more detail hereinafter or which will be apparent to one skilled in the art upon reading these specifications, I accomplish by that certain construction and arrangement of parts of which I shall now describe an exemplary embodiment.

Reference is made to the drawings forming a part hereof and in which.

Figure 1:
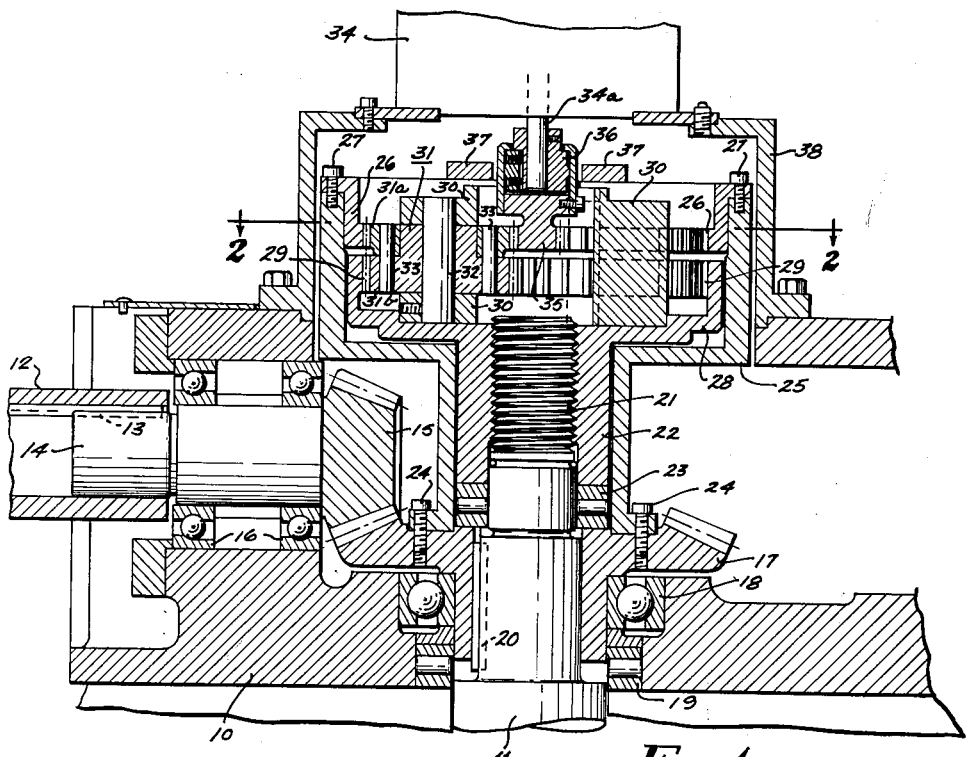
FIGURE 1 is a cross-sectional view through the adjusting mechanism taken on the line 1—1 of FIGURE 2.
Figure 2:
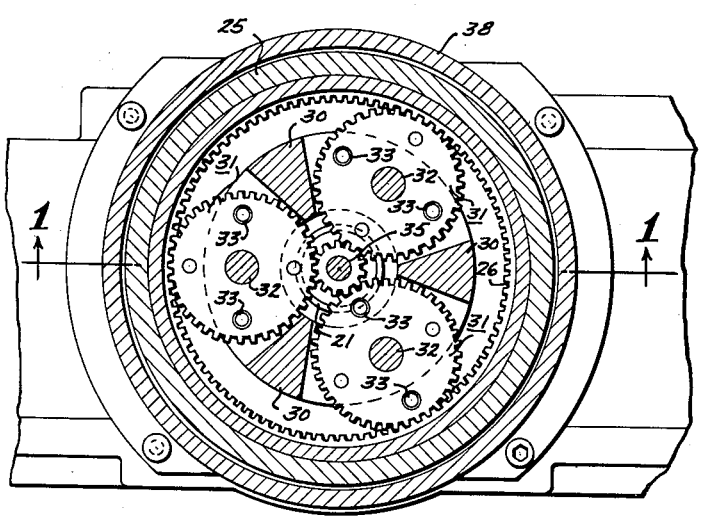
FIGURE 2 is a cross-sectional view taken on the line 2—2 of FIGURE 1.

Briefly, in the practice of the invention I provide on the elevating screw in one of the columns a separate threaded portion and I provide a nut arranged to cooperate with the separate threaded portion. This elevating screw is arranged to be capable of a small amount of axial movement. I then provide a small electric motor driving the sun gear of a planetary gearing arrangement by means of which the nut is driven. As the nut rotates, the elevating screw is moved axially a small amount in the desired direction without disturbing the gear train by means of which the elevating screw is rotated for raising and lowering the cross-rail. It will be understood that when the leveling mechanism is inactive, this elevating screw is held in axially fixed position by its own weight plus the weight of the cross rail.

In the drawings, only so much of the apparatus has been shown as is necessary to an understanding of the invention. Thus, the column and the cross-rail have not been shown nor has the bed or table of the machine tool. At 10 is indicated the frame member which normally extends between the columns of the machine tool at the top of the columns and in which the gearing for the drive of the elevating screw is generally located. It will be understood that in the specific embodiment shown, the elevating screw is driven to produce movement of the cross-rail but it will be clear to one skilled in the art that the invention applied equally to situations where the elevating screw is stationary and the nut is driven.

Figure 3:
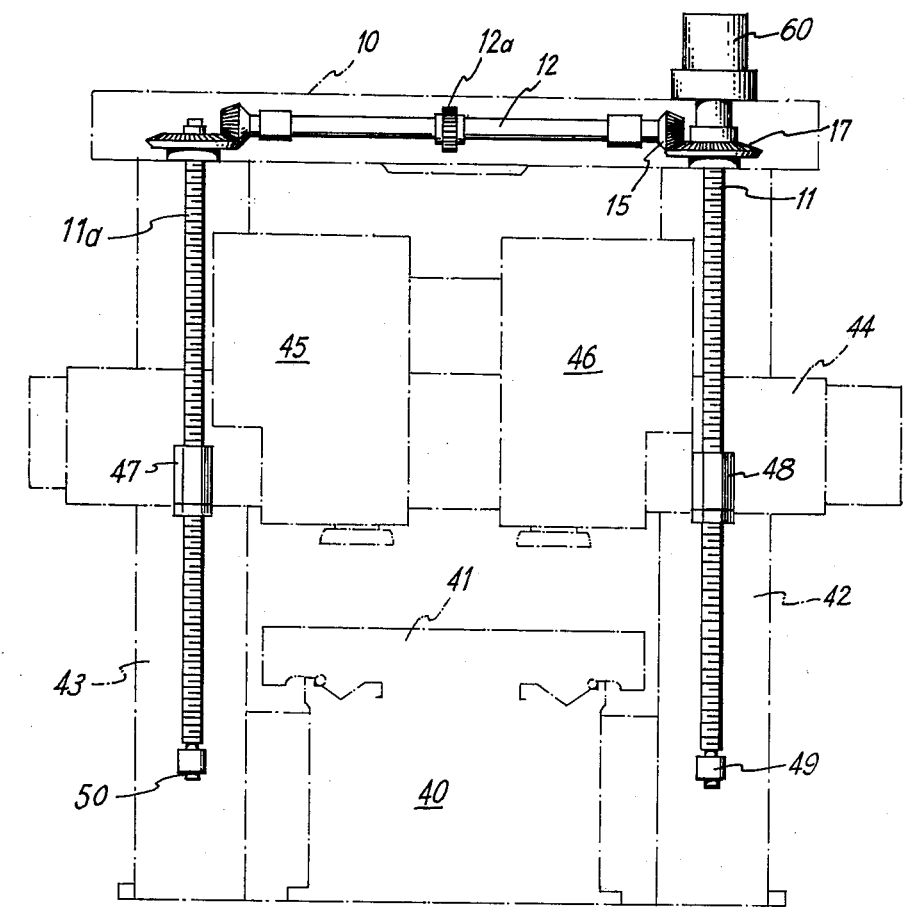
FIGURE 3 is a phantom view of a typical planar type milling machine in which the cross-rail drive is shown in solid lines.

In FIGURE 3, there is shown in phantom lines a typical planar type milling machine in which the drive for the cross-rail is shown somewhat diagrammatically in solid lines. In this figure, the bed of the machine is designated by the numeral 40 and the table which reciprocates on the bed at 41. The columns are shown at 42 and 43 and the cross-rail is shown at 44 carrying the two heads 45 and 46. For the detailed showing of the invention, reference should be had to FIGURE 1 which shows the details of the mechanism at the upper right hand corner of FIGURE 3. The adjusting mechanism is indicated diagrammatically as being contained within the box 60. The gear 12a on the shaft 12 is driven by a motor unit (not shown) for rotating the screws 11 and 11a simultaneously. The elevating screws 11 and 11a engage the nuts 47 and 48 which are fast in the cross-rail 44 so that as the screws 11 and 11a rotate, the nuts 47 and 48 are caused to move upward or downward along the screws, depending on the direction of rotation thereof. At their lower ends the screws 11 and 11a are supported in simple radial bearings 49 and 50 which permit the screw 11 to be moved axially by the apparatus hereinafter to be described.

In FIGURE 1, the upper end of the elevating screw for one of the columns is indicated at 11. It is driven from the drive shaft 12 which is keyed as at 13 to the hub 14 of the bevel pinion 15. The bevel pinion 15 is conventionally mounted in the ball bearings indicated generally at 16.

The bevel pinion 15 drives the bevel gear 17 which is mounted in the radial ball bearing 18 and rotates on a thrust roller bearing 19. The upper end of the elevating screw 11 is slidably keyed to the hub of the bevel gear 17 as indicated at 20.

In normal operation the rotation of the drive shaft 12 is transmitted by the pinion 15 to the gear 17 and thence by the key 20 to the elevating screw which results in raising or lowering the cross-rail, depending upon the direction of rotation of the screw 11.

According to the present invention, I provide means for adjusting the level of the cross-rail by means adapted to move the elevating screw 11 axially upward or downward. This mechanism is provided in only one of the columns so that with the cross-rail remaining stationary at its other end, the end carrying the nut cooperating with the elevating screw 11 will thus be raised or lowered to achieve the desired level condition.

The raising and lowering of the screw 11 is accomplished by providing at the upper end of the screw 11 a separately threaded portion 21 and by providing a nut 22 in engagement with the threaded portion 21. The nut 22 is arranged for rotation with respect to the portion 21 and rests on the roller thrust bearing 23.

Secured to the bevel gear 17 as by means of the bolts 24 is a cup-like member 25 which carries the ring gear 26 which may be bolted to the upper end of the member 25 by means of the bolts 27. The nut 22 is in effect the hub of an inner cup-like member 28 which carries at its upper edge the ring gear 29.

Within the inner cup-like member 28 there is provided a planetary gear carrier 30 which carries three planetary gears indicated generally at 31. Each of the gears 31 is mounted on a stud 32 and each is actually a gear pair. Each gear pair is made up of an upper planetary gear 31a and a lower planetary gear 31b. In the drawings these have been shown as separate and secured together by the pins 33 but it will be understood that they could, if desired, be made integrally. As will be clear from FIGURE 1, the planet gears 31a mesh with the ring gear 26 while the planet gears 31b mesh with the ring gear 29.

The drive is imparted by means of an electric motor 34 driving a sun gear 35 through a friction drive of known construction indicated generally at 36. Bars 37 extend across the cup-like member 25 and are simply for the purpose of preventing the carrier 30 for the planetary gears from jumping up out of place. The gear train just described is enclosed within a housing element 38 bolted to the member 10 as shown and the motor 34 is mounted on the member 38 in any desired manner.

The ring gears 26 and 29 are very nearly the same diameter but actually have a different pitch diameter and different numbers of teeth. Similarly, the planetary gears are almost the same diameter but not quite and have different numbers of teeth. In an actual embodiment and by way of example only, one of the ring gears has a pitch diameter of 7.916 inches and the other has a pitch diameter of 7.900 inches. Thus, there is a difference in diameter of .016 inch. The ring gear which is slightly larger, i.e. thhe ring gear 26, has ninety-five teeth of twelve pitch while the ring gear 29 has seventy-nine teeth of ten pitch. Similarly, the planetary gears 31a which mesh with the ring gear 26 have a pitch diameter of 3.416 inches and have forty-one teeth of twelve pitch, while the planetary gears 31b which mesh with the ring gear 29 have a pitch diameter of 3.400 inches and have thirty-four teeth of ten pitch. It will again be observed that the difference in pitch diameter of the gears 31a and 31 is .016 inch. In this specific embodiment described, the sun gear has a pitch diameter of 1.083 inches and has thirteen teeth of twelve pitch. The motor 34 operates at 1200 r.p.m. and it can be calculated from the above figures that the gear reduction is 3113:1, so that the nut 22 rotates at ⅓ r.p.m. In the actual apparatus described above, this gives an adjustment rate vertically of .001 inch per second.

It is believed that the operation of the device will now be clear. Assuming that it is desired to elevate or lower a cross-rail, power is transmitted through the shaft 12, key 13, hub 14, bevel pinion 15, bevel gear 17, key 20, to the elevating screw 11. A similar train at the opposite end of the machine produces rotation of elevating screw in the other column. Since, as is conventional, these elevating screws cooperate with nuts fixed in the cross-rail, the cross-rail will be raised or lowered depending upon the direction of rotation of the shaft 12. Since the cup-like member 25 is bolted to the bevel gear 17, it rotates with the gear 17 whereby the ring gear 26, the planetary carrier 30, the ring gear 29, and the cup-like member 28 and nut 22, as well as the sun gear 35 and the shaft 34a of the motor all rotate as a unit with no relative motion between any of the above named parts. In other words, under these conditions the device of the invention is entirely idle.

If it now be desired to adjust the level with the shaft 12 stationary and thus the bevel pinion 15, bevel gear 17, cup-like member 25 and ring gear 26 stationary, power is applied to the motor 34 which drives the sun gear 35. The rotation of the sun gear 35 is transmitted to the three planet gears 31a but since the ring gear 26 is now fixed, the result is that the planetary gears 31a simply run around the ring gear 26 and thus rotate the carrier 30. The rotation of the planetary gears 31a is of course transmitted to the planetary gears 31b, which are respectively secured to the gears 31a and these similarly run around inside the ring gear 29 but because of the slight difference in pitch diameters and the difference in the number of teeth, the result is a very slow rotation of the ring gear 29 with respect to the ring gear 26. This slow rotation of the ring gear 29 is of course transmitted to the nut 22 and this results in axial movement of the threaded portion 21 and the elevating screw 11.

It will be understood that because of the diameters of the ring gears being nearly the same although specifically different, the torque and the reaction in the gear train are practically balanced so that there is no tendency to drive back through the ring gear 26 to the bevel gear 17. It will also be seen that it is entirely unnecessary to provide for any clutching apparatus or for any way of disengaging the ordinary drive train for the elevating screw.

It will also be clear that this invention is equally applicable to a machine tool in which the elevating screws are fixed and in which the cross-rail is raised or lowered by rotating the nut cooperating with each elevating screw. All that is necessary is that the cup-like members 25 be fixed to that one of the cooperating screw and nut which is rotated for operating the cross-rail.

There are on the market a number of sensing devices for sensing when the rail is out of level. It is of course within the scope of this invention to mount such a device on the rail and connect it operatively to the level adjusting motor 34, so as to provide for automatic leveling. The connections will be within the capabilities of one skilled in the art.

Numerous modifications may of course be made without departing from the spirit of the invention and it should therefore be understood that no limitations other than those specifically set forth in the claims are intended.

Having now fully described the invention, what I claim as new and desire to secure by Letters Patent is:

1. In a machine tool having spaced columns and a cross-rail extending therebetween, said rail being arranged for vertical movement with respect to said columns on cooperating ways by means of an elevating screw in each of said columns, a nut on each end of said rail in operative relation with a respective one of said elevating screws, said screws and nuts being normally restrained against axial movement, and means for concurrently producing relative rotation between the respective screws and nuts; level adjusting means for said rail, comprising means associated with one of said elevating screws for moving said one screw axially.

2. A device according to claim 1, wherein said last named means comprise a separate threaded portion on one end of said one screw, and an adjusting nut in engagement with said separate threaded portion, said adjusting nut being fixed against axial movement, and means for rotating said adjusting nut.

3. A device according to claim 2, wherein said adjusting nut is driven through speed reduction gearing by an electric motor.

4. A device according to claim 3, wherein said speed reduction is of the order of 3000:1.

5. A device according to claim 3, wherein said speed reduction gearing comprises a planetary gear train having a sun gear driven by said motor, a number of double planetary gears mounted in a carrier and constituting two sets of planetary gears, one set meshing with said sun gear and with a ring gear secured to that one of said elevating screw and nut which is rotated to elevate or lower said cross rail, the other set meshing with a second ring gear secured to said adjusting nut, said ring gears and planetary gear sets respectively being of nearly the same diameter, but having slightly different pitch diameters.

6. In a machine tool having spaced columns and a cross-rail extending therebetween, said rail being arranged for vertical movement with respect to said columns on cooperating ways by means of a rotatable elevating screw in each of said columns, a fixed nut on each end of said rail in operative relation with a respective one of said elevating screws, said screws being normally restrained against axial movement, and means for concurrently rotating said elevating screws; level adjusting means for said rail, comprising means associated with one of said elevating screws for moving said one screw axially.

7. A device according to claim 6, wherein said last named means comprise a separate threaded portion on one end of said one screw, and an adjusting nut in engagement with said separate threaded portion, said adjusting nut being fixed against axial movement, and means for rotating said adjusting nut.

8. A device according to claim 7, wherein said adjusting nut is driven through speed reduction gearing by an electric motor.

9. A device according to claim 8, wherein said speed reduction is of the order of 3000:1.

10. A device according to claim 8, wherein said elevating screws are driven through pairs of bevel gears, the bevel gear secured to said one elevating screw carrying also a ring gear, and wherein said speed reduction gearing comprises a planetary gear train having a sun gear driven by said motor, a number of double planetary gears mounted in a carrier and constituting two sets of planetary gears, one set meshing with said sun gear and with said ring gear, the other set meshing with a second ring gear secured to said adjusting nut, said ring gears and planetary gear sets respectively being of nearly the same diameter, but having slightly different pitch diameters.

11. In a machine tool having spaced columns and a cross-rail extending therebetween, said rail being arranged for vertical movement with respect to said columns on cooperating ways by means of an elevating screw in each of said columns, a nut on each end of said rail in operative relation with a respective one of said elevating screws, said screws and nuts being normally restrained against axial movement, and means for concurrently producing relative rotation between the respective screws and nuts; level adjusting means for said rail at one end thereof, comprising an outer cup-like member secured to that one of said elevating screw and nut which is rotated to elevate and lower said cross-rail at said one end, said cup-like member carrying a first ring gear, an inner cup-like member disposed coaxially with said outer member and having an internally threaded hub constituting an adjusting nut, the elevating screw at said one end of said rail having at one end a separate threaded portion in engagement with the threads on said hub nut, a second ring gear forming a part of said inner member, said ring gears having slightly different pitch diameters but being of substantially the same diameter, a sun gear mounted coaxially of said cup-like members and in the plane of said first ring gear, a plurality of first planet gears mounted in a carrier and meshing with said sun gear and said first ring gear, a plurality of second planet gears fixed respectively to said first planet gears and being of substantially the same diameter but having a slightly different pitch diameter than said first planet gears, said second planet gears meshing with said second ring gear, and a motor for driving said sun gear; whereby operation of said motor while said elevating screw is stationary produces slow rotation of said hub nut, thereby moving said elevating screw axially to adjust the level of said cross-rail, and whereby rotation of said elevating screw without operation of said motor produces rotation, as a unit, of both said ring gears, carrier and sun gear without relative rotation therebetween.

12. In a machine tool having spaced columns and a cross-rail extending therebetween, said rail being arranged for vertical movement with respect to said columns on cooperating ways by means of a rotatable elevating screw in each of said columns, a fixed nut on each end of said rail in operative relation with a respective one of said elevating screws, said screws being normally restrained against axial movement, and means for concurrently rotating said elevating screws; level adjusting means for said rail at one end thereof, comprising an outer cup-like member secured to the elevating screw at said one end, said cup-like member carrying a first ring gear, an inner cup-like member disposed coaxially with said outer member and having an internally threaded hub constituting an adjusting nut, the elevating screw at said one end of said rail having at one end a separate threaded portion in engagement with the threads on said hub nut, a second ring gear forming a part of said inner member, said ring gears having slightly different pitch diameters but being of substantially the same diameter, a sun gear mounted coaxially of said cup-like members and in the plane of said first ring gear, a plurality of first planet gears mounted in a carrier and meshing with said sun gear and said first ring gear, a plurality of second planet gears fixed respectively to said first planet gears and being of substantially the same diameter but having a slightly different pitch diameter than said first planet gears, said second planet gears meshing with said second ring gear, and a motor for driving said sun gear; whereby operation of said motor while said elevating screw is stationary produces slow rotation of said hub nut, thereby moving said elevating screw axially to adjust the level of said cross-rail, and whereby rotation of said elevating screw without operation of said motor produces rotation, as a unit, of both said ring gears, carrier and sun gear without relative rotation therebetween.

References Cited in the file of this patent

UNITED STATES PATENTS

| 2,854,868 | Hake et al. | Oct. 7, 1958 |
| 2,901,947 | Waninger et al. | Sept. 1, 1959 |

FOREIGN PATENTS

| 410,417 | Germany | Mar. 6, 1925 |